Dec. 2, 1952     S. RUBEN     2,620,368
ALKALINE DRY CELL
Filed Dec. 23, 1947
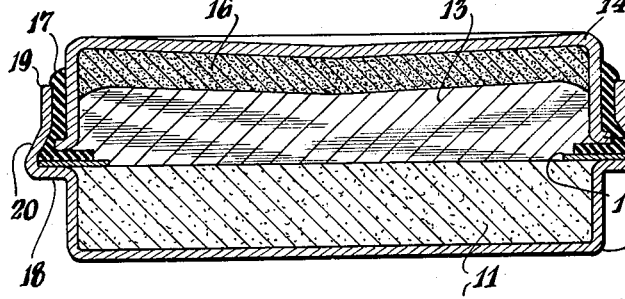
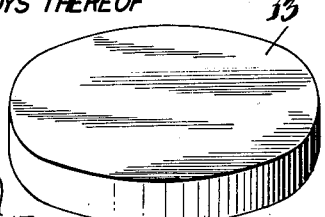
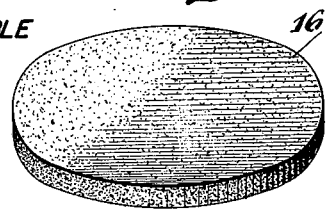
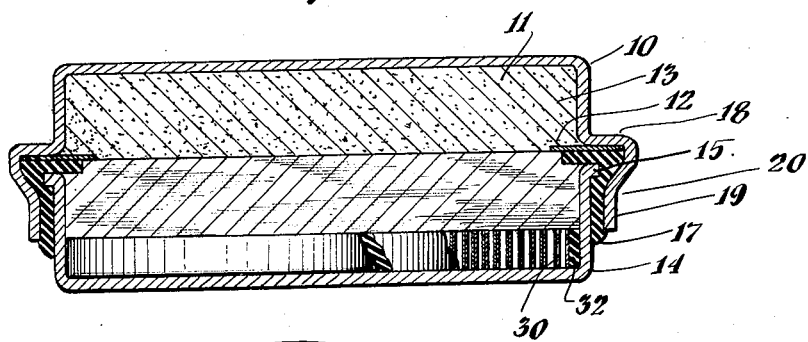
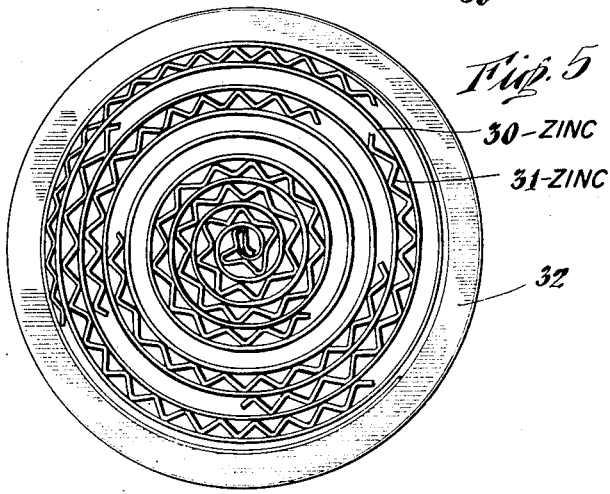
INVENTOR.
Samuel Ruben
BY
Nicholas Laws Jr.
ATTORNEY Patented Dec. 2, 1952

2,620,368

UNITED STATES PATENT OFFICE 2,620,368

ALKALINE DRY CELL

Samuel Ruben, New Rochelle, N. Y.

Application December 23, 1947, Serial No. 793,406

11 Claims. (Cl. 136—107)

This invention relates to alkaline dry cells, and, more particularly, to an alkaline dry cell of novel and improved character.

In my U. S. Patent 2,422,045, dated June 10, 1950, relating to an Alkaline Dry Cell, there is disclosed a sealed alkaline primary cell having an amalgamated zinc anode, a cathode formed of a conductive body containing an electrolytically reducible oxygen-yielding compound (such as mercuric or silver oxide) and an immobilized electrolyte comprising an aqueous solution of an alkali metal hydroxide (such as potassium hydroxide) containing a substantial quantity of alkali metal zincate. The presence of the zincate in the electrolyte, in combination with other features described in the said patent, prevents or strongly inhibits any tendency for a chemical hydrogen-generating reaction $$(Zn + 2H^+ \rightarrow Zn^{++} + H_2)$$

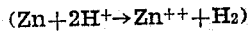

to take place between the electrolyte and the zinc anode when the cell is stored prior to use as well as during active use. These factors have made possible a sealed alkaline dry cell which does not generate appreciable gas or leak electrolyte during shelf life or when in use.

In my co-pending applications Serial No. 468,386, and Serial No. 752,857, filed December 9, 1942, and June 6, 1947, respectively, now Patents Nos. 2,463,565 and 2,536,699, issued March 8, 1949, and January 2, 1951, respectively, I have disclosed and claimed a primary cell comprising a pair of electrodes and a solid crystalline alkaline electrolyte interposed between and in contact with said electrodes.

In my co-pending application Serial No. 671,200, filed May 21, 1946, now Patent No. 2,606,941, issued August 12, 1952, I have disclosed and claimed a dry primary cell of flat or button-like construction comprising an anode of compressed metal powder and an electrolyte element for the cell which may be formed of an aqueous alkaline solution which is immobilized by a compatible addition agent, preferably a material which converts the electrolyte into a gel.

In my co-pending application Serial No. 682,734, filed July 11, 1946, now Patent No. 2,543,575, issued February 20, 1951, I have disclosed and claimed alkaline dry cells comprising an amalgamated zinc anode, a pressed cathode-depolarizer body, and a body of alkaline electrolyte gel interposed between said anode and cathode. Preferably, the zinc anode is surrounded by and is in contact with a cell container formed of a metal inert to the electrolyte and having a low contact potential to zinc. The quantity of zinc in the anode is balanced with the depolarizing capacity of the cathode so that both anode and cathode are consumed substantially simultaneously. In practice, a slight excess of oxide is used. When such a cell combination is employed with an alkaline electrolyte, it makes possible the provision of a sealed alkaline dry cell which is free of any tendency to electrolyte leakage or appreciable gas generation during shelf life, current generating life and at end of life. Such a cell can safely be used in any sort of equipment without hazard or damage due to electrolyte leakage or cell disintegration, even if the cell is allowed to remain in the equipment long after the end of its useful life.

In my co-pending application Serial No 779,874, filed October 15, 1947, now Patent No. 2,542,576, issued February 20, 1951, I have disclosed an alkaline dry cell comprising an improved electrode assembly and a gel electrolyte of special composition and characteristics.

The present application is related to alkaline dry cells of the general class disclosed and claimed in my aforesaid Patent No. 2,422,045, and is a continuaton-in-part of all of my aforesaid co-pending applications and constitutes an improvement thereover.

An object of the present invention is to improve alkaline dry cells.

Other objects will be apparent from the following description and claims.

The present invention contemplates a dry primary cell comprising an amalgamated zinc anode, a cathode formed of a coherent conductive body containing a cathode depolarizer and an electrolyte of generally solid consistency, such as one in the form of a gel formed of an aqueous solution of an alkali metal hydroxide, such as potassium hydroxide, immobilized by addition of a suitable gelling agent, such as sodium carboxymethyl cellulose. While anodes of various types are useful for the purposes of the present invention, particularly good results are obtained with anodes pressed from amalgamated zinc powder or shot.

In the drawings:

Fig 1 is a sectional view of a flat or button-type dry cell embodying features of the present invention;

Fig. 2 is a perspective view of the electrolyte element employed in the cell of the invention;

Fig. 3 is a perspective view of the anode element employed in the cell of Fig. 1;

Fig. 4 is a sectional view of a cell similar to the one shown in Fig. 1 and embodying a honeycomb-type anode; and Fig. 5 is a top elevational view of the anode container or shell of the cell illustrated in Fig. 4, with the honeycomb anode therein.

Referring now more particularly to Figs. 1 to 3 of the drawing, reference numeral 10 denotes a shallow cup-shaped cathode container or shell formed of a suitable inert metal, such as steel.

Within this container, there is compressed cathode-depolarizer body 11 comprising an electronically conducting electrolytically-reducible oxygen-yielding compound having a smaller quantity of inert material of higher conductivity admixed thereto. The cathode body may be in the form of a prepressed pellet of 95% mercuric oxide and 5% graphite which is inserted into the cathode container and is consolidated therein by a higher pressure. Upon the upper surface of cathode body 11 rests an insulative ring or washer 12 of styrene.

Reference numeral 13 denotes a disc or slug of gelled electrolyte material. The preferred gel electrolyte for the cells of the present invention comprises an aqueous alkali metal hydroxide solution, preferably a KOH solution, which is gelled with an alkali metal salt of carboxy-methyl cellulose, such as sodium carboxy-methyl cellulose. Sodium carboxy-methyl cellulose is a cellulose derivative that is readily soluble or dispersible in water, and is readily obtainable in the form of a white granular powder. The preferred range of concentration of the KOH used in preparing the electrolyte is from 30% to 50%.

One suitable electrolyte is formed of:

C. P. potassium hydroxide (88% KOH)
grams__ 100
Water _____ml__ 100

The sodium carboxy-methyl cellulose is added to the electrolyte in proportions of 5 grams per 100 ml. of the electrolyte. The sodium carboxymethyl cellulose is crushed and screened through a 40 mesh screen and is added slowly to the solution, with constant stirring. This forms a viscous suspension which can be converted to a gel by heating to a temperature of at least 100° C. and preferably to just below the temperature at which the mixture starts to boil. In most cases, this will be about 117°–120° C. at which point a clear liquid solution is obtained which, upon cooling, will form a clear, homogeneous, self-supporting gel.

In preparing electrolyte discs or slugs 13, the preferred method is to pour the clear solution of the hot liquid electrolyte containing the gelling agent into a suitable mold where it gels into a flat sheet. After cooling the stiff gel sheet is removed from the mold and electrolyte discs are punched from it. It is also possible, however, to pour the hot liquid electrolyte with the gelling agent therein directly into the cell container which is heated to the temperatures mentioned above and thereafter allowing the gel to cool and to consolidate in the cell.

Anode container 14 is in the form of a shallow cup having an outwardly flaring flange 15 at its edge and formed of a metal inert to the electrolyte and having, when amalgamated, a low contact potential to zinc. Examples of suitable materials for the anode container are copper, silver-plated copper, and silver and alloys thereof with other metals. Particularly good results are obtained with anode containers formed of commercial bronze which is an alloy of 90% copper and 10% zinc. Before assembling the cell, the inner surface of bronze can 14 is amalgamated, for example by pouring into it an acidified 3% mercuric nitrate solution having a temperature of 53° C. and maintaining the solution therein for five minutes. After amalgamation, the solution is poured off and the can is washed and dried.

In anode container 14 there is compressed a body of amalgamated zinc powder 16 constituting the anode of the cell. The preferred amalgamation process is to cover zinc powder with a 5% HCl solution heated to 75–80° C., add 10% of mercury in a fine stream and stir the entire mixture so as to distribute the amalgamation uniformly over the entire mass. The mixture is tumbled for one-half hour and water washed free of chlorides. The amalgamated zinc is then drained of water and rinsed in 2 successive baths of alcohol or acetone and dried by heat or air circulation. Continued tumbling during drying will speed up evaporation and also prevent formation of lumps. The pressed pellet of amalgamated zinc powder is inserted into the anode container and is consolidated therein by a pressure which is substantially higher than the pelleting pressure.

It is preferred to slightly predistort the top surface of anode shell 14 so that, upon consolidation of the amalgamated zinc pellet therein, the operative surface of the anode is rendered slightly convex, as this is set forth more fully in the copending application of Fred D. Williams, Jr., Serial No. 760,297, filed July 11, 1947, now Patent No. 2,499,239, dated February 28, 1950, for Button Type Alkaline Dry Cell.

I have discovered that for best results the pressed zinc powder anode is saturated with electrolyte prior to final assembly of the cell otherwise it will absorb electrolyte from the gel disc 13, causing it to dry and shrink, since the volume of the gel disc is proportional to its electrolyte content. Shrinking of the gel disc would detrimentally influence the good electrical contact between the anode body and the gel disc and in extreme cases would render the cell inoperative. This difficulty is completely avoided by preliminary impregnation of the anode with the electrolyte. In general, the amount of electrolyte required is about 7% of the volume of the anode.

Some absorption of electrolyte takes place also at the boundary surface of the gel disc 13 and the cathode-depolarizer body 11. However, by having the gel disc under compression, contact with the cathode body is assured, such contact being further improved by the high degree of adhesion between the gel disc and the cathode.

The electrolyte used for impregnating the zinc powder anode may have the same composition as that employed in the preparation of the gel disc, that is 100 grams KOH and 100 ml. H2O, there being, of course, no gelling agent added to the electrolyte. I have found, however, that further improved results are obtained by providing a substantial quantity of alkali metal zincate in the impregnating electrolyte. Thus, good results are obtained with impregnating electrolytes of the following composition:

(A) C. P. potassium hydroxide (88% KOH)
grams__ 125
Zinc oxide_____do____ 30
Water _____ml__ 100

(B) C. P. potassium hydroxide (88% KOH)
grams__ 100
Zinc oxide_____do____ 16
Water _____ml__ 100

The initial presence of a substantial quantity of alkali metal zincate (such as potassium zincate) in the impregnating electrolyte is instrumental in reducing the open circuit reactivity of the cell materials to a negligible value. This is essential in that it improves the shelf and also the useful life of the cell and becomes critically important when the cell is stored and used at elevated temperatures, such as are encountered in the tropics. It will be noted, on the other hand, that no zinc oxide is used in the preparation of the gel electrolyte disc 13 so that the said disc is at least initially, substantially free from alkali metal zincate. A cell employing an electrolyte disc of the described composition is characterized by an extremely low internal resistance and consequently by a very high flash current, this phenomenon being particularly accentuated at very low operating temperatures in the order of —30° C., as this will be set forth more fully in the following. By impregnating the anode with an electrolyte containing a substantial quantity of alkali metal zincate and by using a gelled electrolyte initially containing no zincate, the advantage of good shelf life at elevated temperatures is realized together with the advantages of high flash current and low internal resistance at low operating temperatures.

In assembling the cell, gel disc 13 is inserted into anode container 14 into surface contact with the electrolyte-saturated zinc powder anode 16. An insulative sealing ring or grommet 17 of polyethylene is stretched around the flared edge 15 of the anode container and the said container is inserted into the open end of cathode container 10, resting on shoulder 18 of the cathode container. Thereupon, the upwardly extending edge 19 of the cathode container is pressed against the circumferential surface of the anode container, forming the crimp seal 20 shown in Fig. 1. Grommet 17 is strongly compressed between cooperating portions of the anode and cathode containers and constitutes therewith a substantially fluid-tight enclosure for the cell.

In a practical cell of the described character, the anode container was formed of commercial bronze sheet 0.020″ thick, had a diameter of 1.160″ and an overall height of 0.285″. The pressed amalgamated zinc powder anode had a composition of 90% by weight zinc and 10% by weight mercury. It was pressed into a pellet weighing 4.7 grams, having a diameter of 1.05″ and a height of 0.145″ at a pressure of 5000 pounds per square inch and was consolidated in the anode container or shell at a pressure of 7000 pounds per square inch. The zinc powder anode was impregnated before its assembly with 0.25 to 0.30 ml. of an electrolyte prepared by the reaction of 125 parts by weight of KOH, 100 parts by weight of $H_2O$ and 30 parts by weight of ZnO or by the reaction of 100 parts by weight of KOH, 100 parts by weight of $H_2O$ and 16 parts by weight of ZnO.

The gel electrolyte was provided in the form of a disc or slug of a diameter of 0.950″, having a thickness of 0.270″ and weighed 4.5 grams. It was prepared by dissolving 100 parts by weight of KOH in 100 parts by weight of water, and converting the solution into a tough, rubbery gel by the addition of 5 grams of sodium carboxymethyl cellulose to each 100 ml. of the electrolyte solution. The sealing and insulating grommet was formed of polyethylene. The styrene spacer washer 12 interposed between the gel electrolyte and the cathode depolarizer had inner and outer diameters of 1.190″ and 0.900″, respectively, and was 0.005″ thick.

The cathode container was formed of steel sheet 0.015″ thick and was 0.152″ deep measured from the bottom up to the shoulder. The cathode depolarizer was formed by mixing 95% by weight mercuric oxide with 5% by weight of graphite. The mixture was pressed into a pellet 1.06″ in diameter weighing 16 grams at a pressure of 12,000 pounds per square inch and the pellet was further compressed and consolidated in the cathode container or shell at a pressure of 30,000 pounds per square inch. The completed cell had an open circuit potential of 1.35 volts.

While the cell described in the foregoing comprises an anode shell of amalgamated commercial bronze and a cathode shell of steel, in some cases it may be desirable to form both of the shells of non-magnetic material. Thus, it is possible to form both shells from copper or silver, or of suitable non-magnetic alloys of copper or silver with other metals. For example, each of the shells may be formed of silver-plated copper whereby a cell of completely non-magnetic character is provided.

It has been noted that one of the essential features of the invention is the provision of a sealed alkaline dry cell comprising an electrolyte of substantially solid consistency formed of an aqueous solution of an alkali metal hydroxide in the absence of zinc oxide. The electrolyte of substantially solid consistency may be a gel electrolyte in which the said aqueous solution is immobilized by the addition of a small amount of sodium carboxy-methyl cellulose or processed tapioca starch, or a solid crystalline electrolyte, such as is disclosed in my aforesaid co-pending applications Serial Nos. 468,386 and 752,857. In cells employing an immobilized electrolyte of solid consistency of the described character in the preparation of which no zinc oxide is used, a saturated $Zn(OH)_2$ content is built up in the boundary layer of the immobilized electrolyte and the anode, and this tends to limit internal reaction during shelf life and to eliminate cell gassing. Electrolytes having no zinc oxide content can be used with stiff gels because the initial reaction of the $Zn+2KOH=ZnK_2O_2+H_2$ saturates the contacting surface of the immobile gel with potassium zincate while its body remains substantially free from such zincate. The same reaction occurs with solidified potassium hydroxide electrolyte. Any further oxidation of the zinc is retarded due to contact with saturated zincate and immobile electrolyte.

Cells of the described character, in which the addition of zinc oxide to the gelled electrolyte of substantially solid consistency was dispensed with, are characterized by a reduced internal resistance and an increased flash current, this being particularly accentuated when the cells are operated at very low temperatures. Thus, in comparative tests, Ruben cells made with a gelled electrolyte containing zinc oxide (100 parts by weight KOH, 16 parts ZnO and 100 parts $H_2O$, with a small addition of sodium carboxy-methyl cellulose) gave an average flash current of 1.0 ampere at —30° C., while cells of identical construction but containing no zinc oxide in the electrolyte (100 parts by weight of KOH and 100 parts of $H_2O$, with a small addition of sodium carboxy-methyl cellulose) gave an average flash current of 2.0 amperes at the same low temperature. In other words, the omission of zinc oxide in electrolytes of generally solid consistency resulted in an increase of 100% in flash current at low operating temperatures.

Figs. 4 and 5 illustrate a primary cell of the general type shown in Fig. 1 but embodying an anode of modified construction, suitable for sealed alkaline cells of the type disclosed in the present application and in my aforesaid co-pending applications. It will be readily observed that, as to its physical construction, with the exception of the anode, the modified cell is closely similar to the one depicted in Fig. 1 and for this reason similar reference numerals have been used to denote corresponding parts. It will not be necessary therefore, to repeat description of the elements common to both Figs. 1 and 4 (or 5) although it may be noted that the position of the cell, as illustrated in Fig. 4, is inverted with respect to that of the cell illustrated in Fig. 1, that is the cathode shell is shown at the top, for reasons which will appear presently.

The modified anode is provided in the form of a disc-shaped member characterized by a honeycomb structure having a large number of small openings or channels extending through the thickness thereof. As it will best appear from Fig. 5, a structure of this type may be obtained by spirally winding up a plane zinc strip 30 together with a corrugated zinc strip 31. The wound structure is held together by means of a sleeve 32 of suitable insulating material, such as styrene. For example, in a practical cell, the structure was built up from plane and corrugated zinc strips having a thickness of 0.01″ and a width of 0.1″. The corrugated strip was provided with 11 corrugations per linear inch, each corrugation being 0.06″ deep, and the diameter of the finished anode disc was determined in accordance with the cell dimensions. Of course, a similar honeycomb structure characterized by a large number of closely spaced channels extending through the thickness thereof and by a high surface to volume ratio may be obtained by other procedures, such as by die casting, extruding from zinc sheet, coining from a zinc slug, or by powder metallurgical methods.

Before assembling the honeycomb anode with the cell, it is amalgamated in a 3% mercuric nitrate solution and is washed and dried. The amalgamated anode is then inserted into anode container or shell 14 placed with its open end up. An electrolyte is prepared for example by dissolving 100 grams of KOH in 100 ml. of water, adding 5 grams of sodium carboxy-methyl cellulose for each 100 ml. of the solution. The resulting mixture is cooled to a low temperature, such as 0° C., and is poured in the liquid state into the anode shell to completely fill the same, including the interstices of the honeycomb anode. The anode subassembly is placed in an oven maintained at 117° to 120° C. for 5 minutes to cause the formation of a stiff gel. Sealing and insulating grommet 19 is placed around the outwardly flared edge of anode shell 14 and the anode subassembly is then secured to a cathode subassembly comprising cathode shell 10, cathode depolarizer body 11 and styrene ring 18 by means of a crimp seal.

As an alternative, it is also possible to pour the electrolyte gel, while in the liquid phase, into the anode shell to a level sufficient to cover the honeycomb anode. Upon gelling of the electrolyte, a prefabricated electrolyte slug of suitable dimensions is placed on top of the anode. In that case, it is preferred to employ zinc oxide in the preparation of the electrolyte that is used to fill out the interstices of the honeycomb anode but no zinc oxide in the preparation of the electrolyte slug. In either case, it is desirable to have the cell elements under moderate compression in the assembled condition of the cell in order to assure positive contact of the anode and cathode with the body of electrolyte and also good contact of the honeycomb with the anode shell. Contact between the bottom surface of the honeycomb anode and of the anode shell is further improved by the amalgam bond that is readily formed therebetween.

Although the present invention has been disclosed in connection with a few preferred embodiments thereof, variations and modifications may be resorted to by those skilled in the art without departing from the principles of the present invention. I consider all of these variations and modifications to be within the true spirit and scope of the present invention, as disclosed in the foregoing description and defined by the appended claims.

What is claimed is:

1. A primary cell comprising a porous zinc anode, a coherent conductive cathode containing an electrolytically-reducible oxygen-yielding compound, a body of electrolyte interposed between and in contact with said anode and cathode, said electrolyte comprising a homogeneous, self-supporting gel of an aqueous solution of an alkali metal hydroxide gelled with sodium carboxy-methyl cellulose and being at least initially free from alkali metal zincate, and ungelled electrolyte impregnating said anode, said impregnating electrolyte substantially preventing absorption of electrolyte by said anode from said gel and consequent shrinkage of said gel.

2. A primary cell comprising a porous zinc anode, a coherent conductive cathode containing an electrolytically-reducible oxygen-yielding compound, a self-supporting body of electrolyte gel interposed between and contacting said anode and cathode, and an ungelled electrolyte impregnating said porous anode, said electrolyte comprising an aqueous solution of potassium hydroxide as the active ingredient and being initially substantially free from potassium zincate, the presence of impregnating electrolyte substantially preventing the absorption of electrolyte from the body of electrolyte gel and consequent shrinking of said gel.

3. A primary cell comprising a porous anode formed of compressed amalgamated zinc particles, a coherent conductive cathode containing an electrolytically-reducible oxygen-yielding compound, a body of electrolyte gel interposed between and in contact with said anode and cathode, and an ungelled electrolyte impregnating said porous anode, said electrolyte gel comprising an aqueous solution of potassium hydroxide as the active ingredient and being initially substantially free from potassium zincate, and said impregnating electrolyte likewise comprising an aqueous solution of potassium hydroxide as the active ingredient but initially containing a substantial quantity of potassium zincate.

4. A primary cell comprising an anode in the form of a porous compact of amalgamated zinc particles, a coherent conductive cathode containing an electrolytically-reducible oxygen-yielding compound, a body of electrolyte gel interposed between and in contact with said anode and cathode, and a liquid electrolyte impregnating said porous anode, said electrolyte gel comprising an aqueous solution of potassium hydroxide immobilized with an addition of sodium carboxy-methyl cellulose and initially being substantially free from potassium zincate, and said impregnating electrolyte comprising an aqueous solution of potassium hydroxide initially containing potassium zincate in an amount sufficient to reduce the open circuit reactivity between said electrolyte and said anode to a negligible value.

5. A primary cell comprising an anode constituted by a porous compact of amalgamated zinc particles, a coherent conductive cathode containing an electrolytically-reducible oxygen-yielding compound, a self-supporting body of alkaline electrolyte of generally solid consistency interposed between and in contact with said anode and cathode, and a liquid ungelled alkaline electrolyte impregnating said anode, said impregnating electrolyte being in an amount sufficient to substantially prevent absorption of electrolyte from said electrolyte body and consequent shrinking of such body.

6. A primary cell comprising a pressed porous zinc powder anode, a coherent conductive cathode containing an electrolytically-reducible oxygen-yielding compound, a body of self-supporting electrolyte gel interposed between and in contact with said anode and cathode comprising a gelled aqueous solution of potassium hydroxide, and electrolyte impregnating said anode comprising an ungelled aqueous solution of potassium hydroxide, the volume of said impregnating electrolyte being in the range of 7% of the volume of the said anode and being sufficient to substantially prevent absorption of electrolyte from said electrolyte body and consequent shrinking of said body.

7. A primary cell comprising an anode and a cathode shell, a porous anode body of amalgamated comminuted zinc pressed into said anode shell, a coherent conductive cathode containing an electrolytically - reducible oxygen - yielding compound pressed into said cathode shell, a self-supporting body of gelled alkaline electrolyte interposed between and in pressure contact with said anode and said cathode, ungelled alkaline electrolyte impregnating said anode body, and an insulative sealing gasket compressed between cooperating portions of said anode and cathode shells, the amount of impregnating electrolyte in said anode body substantially preventing the absorption of electrolyte from said gelled electrolyte body and consequent shrinking of said electrolyte body.

8. A non-magnetic primary cell comprising an anode and a cathode shell of metal selected from the group consisting of copper, silver and non-magnetic copper and silver base alloys, a porous anode body of amalgamated zinc powder pressed in said anode shell, a coherent conductive cathode containing an electrolytically-reducible oxygen-yielding compound pressed in said cathode shell, a body of gelled alkaline electrolyte interposed between and in pressure contact with said anode and said cathode, ungelled alkaline electrolyte impregnating said anode, and an insulative sealing gasket compressed between cooperating terminal regions of said anode and cathode shells and defining therewith an airtight enclosure for the cell, the amount of impregnating electrolyte in said anode body substantially preventing the absorption of electrolyte from said gelled electrolyte body and consequent shrinking of said electrolyte body.

9. A primary cell comprising anode and cathode shells, at least said anode shell being of a metal selected from the group consisting of copper, silver, copper base alloys and silver base alloys, a porous anode of amalgamated zinc powder pressed in said anode shell, a coherent conductive cathode containing an electrolytically-reducible oxygen-yielding compound pressed in said cathode shell, a body of gelled potassium hydroxide electrolyte interposed between and in pressure contact with said anode and said cathode, ungelled potassium hydroxide electrolyte impregnating said anode, and an insulative sealing gasket compressed between cooperating terminal regions of said anode and cathode shells and defining therewith an airtight enclosure for the cell, the amount of zinc contained in said cell being not more than that required for operation of the cell up to the depolarizing limit of the cathode and the amount of impregnating electrolyte in said anode being sufficient to substantially prevent the absorption of electrolyte from said gelled electrolyte body and consequent shrinking of said body.

10. A primary cell comprising anode and cathode shells, at least said anode shell being of a metal selected from the group consisting of copper, silver, copper base alloys and silver base alloys, a porous anode of amalgamated zinc powder pressed in said anode shell, a coherent conductive cathode containing an electrolytically-reducible oxygen-yielding compound pressed in said cathode shell, a body of gelled potassium hydroxide electrolyte interposed between and in pressure contact with said anode and said cathode, ungelled potassium hydroxide electrolyte impregnating said anode, and an insulative sealing gasket compressed between cooperating marginal portions of said anode and cathode shells and defining therewith an airtight enclosure for the cell, said ungelled electrolyte initially containing a substantial quantity of potassium zincate and said gelled electrolyte initially being substantially free from potassium zincate, the ungelled electrolyte impregnating the anode being present in an amount sufficient to substantially prevent the absorption of electrolyte from said body of gelled electrolyte and consequent shrinking of said body.

11. A primary cell comprising a porous anode formed of compressed amalgamated zinc particles, a coherent conductive cathode containing an electrolytically - reducible oxygen - yielding compound, a body of electrolyte gel interposed between and in contact with said anode and cathode, and an ungelled electrolyte impregnating said porous anode, said electrolyte gel comprising an aqueous solution of an alkali metal hydroxide as the active ingredient and being initially substantially free from alkali metal zincate, and said impregnating electrolyte likewise comprising an aqueous solution of alkali metal hydroxide as the active ingredient but initially containing a substantial quantity of alkali metal zincate.

SAMUEL RUBEN.

REFERENCES CITED

The following references are of record in the file of this patent:

UNITED STATES PATENTS

| Number | Name | Date |
| --- | --- | --- |
| 298,175 | Clarke | May 6, 1884 |
| 1,137,226 | Manchester | Apr. 27, 1915 |
| 2,422,045 | Ruben | June 10, 1947 |

FOREIGN PATENTS

| Number | Country | Date |
| --- | --- | --- |
| 862,859 | France | Dec. 23, 1940 |

OTHER REFERENCES

Abstract of abandoned applications of Wm. F. Nye (1) S. N. 603,739, filed July 7, 1945, and published Oct. 11, 1949, and (2) S. N. 627,080, filed Nov. 6, 1945, published Jan. 7, 1950.

Hollabaugh et al.: "Industrial and Engineering Chemistry," October 1945, pages 943 and 944.